United States Patent [19]

Asakura

[11] Patent Number: 5,119,353
[45] Date of Patent: Jun. 2, 1992

[54] COMPACT DISC WITH ADDITIONAL MEMORY ADDRESSABLE BY DISC PLAYER

[75] Inventor: Toru Asakura, Suwa, Japan

[73] Assignee: Seiko Epson Corporation, Japan

[21] Appl. No.: 487,751

[22] Filed: Mar. 1, 1990

[30] Foreign Application Priority Data

Mar. 2, 1989 [JP] Japan .................................. 1-48483

[51] Int. Cl.⁵ ...................... G11B 13/00; G11B 11/00; G11B 17/22; G11B 3/70
[52] U.S. Cl. .................................. 369/13; 369/14; 369/15; 369/32; 369/33; 369/273; 369/282; 369/290; 369/292
[58] Field of Search ...................... 369/13, 14, 15, 32, 369/33, 273, 282, 290, 292; 360/69, 72.1, 72.2

[56] References Cited

U.S. PATENT DOCUMENTS

| | | | |
|---|---|---|---|
| 4,338,644 | 7/1982 | Staar | 360/132 |
| 4,523,305 | 6/1985 | Cheeseboro | 369/33 |
| 4,839,875 | 6/1989 | Kuriyama et al. | 369/14 |
| 4,843,484 | 6/1989 | Kanamaru et al. | 358/342 |
| 4,868,373 | 9/1989 | Opheij et al. | 369/14 X |
| 4,872,151 | 10/1989 | Smith | 369/14 |

Primary Examiner—Stuart S. Levy
Assistant Examiner—Tien Ba Pham
Attorney, Agent, or Firm—W. Douglas Carothers, Jr.

[57] ABSTRACT

A compact disc (CD) or CD-ROM disc having at least one surface region containing a field of digitally encoded, reproducible data, outside of a central region of the disc is provided with a second non-volatile read/write memory IC chip or memory device, e.g., an E²-PROM, embedded in the central region adjacent to the data field. Input/output (I/O) terminal is also embedded in the central region and provides for communication with and access to the second nonvolatile memory IC chip device. The terminal has one surface exposed adjacent to the data field for external access by a CD or CD-ROM access player or playback apparatus. The terminal has a series contact engagement means through which access is made by complementary terminal means provided in the player whereby the movement of the disc is terminated and information may be read into or read out of the second nonvolatile memory IC chip device. The invention has particular application to CD-ROM disc players employed for audio/video games and for dictionary database applications for word processing.

5 Claims, 3 Drawing Sheets

COMPACT DISC WITH ADDITIONAL MEMORY ADDRESSABLE BY DISC PLAYER

BACKGROUND OF THE INVENTION

This invention relates generally to a compact or laser disc having a primary memory field for recording information thereon in the form of encoded information in tracks on a surface thereof and more particularly to a compact disc (CD) that contains supplemental memory means outside the primary memory field that is addressable by addressing means in a disc player to read from or write to the compact disc memory means.

Over recent years, the CD has become a mainstay storage memory for playback of recorded audio and visual data, including applications pertaining to text and software. Since this recording is generally permanent in nature, the data had to be considered for playback in the order recorded on the CD. As recognized in U.S. Pat. No. 4,872,151, there was no means for programming the CD per se to dictate the order of play for the data recorded or indication of the parameters and index codes of the recorded data, such as, the number of different recorded data components in the primary memory field, their recorded length and positions of start and ending or other data relating to comments relative to the contents of the recorded data components.

Conventional CD players contain features, such as, an internal memory dedicated to the storing of programming information indicating the order of reproduction of recorded data components in the primary memory field of the CD. However, this type of programming requires introduction of a new programming sequence for CD to be played; otherwise, the order of play will be the same as the program order of play designed and set into the player memory for the previous CD. What is need, then, is some type of supplemental programmable memory associated with the CD rather than the CD player so that the desired order of play of the data components on the CD can be placed in the memory relative to each CD. In this manner, the order of playback desired in connection with each CD can be preprogrammed in the CD requiring no further changes once so prerecorded. However, if the order of replay is desired to be later altered, the altered order of play may be changed in the supplemental CD memory.

Recognizing that conventional CD players lacked means whereby the CD per se provided information relative to the order of data components or other such data which may be automatically recognized and read by the CD player, U.S. Pat. No. 4,872,151 provided means to read the desired order of data components which is stored in memory provided on or in the CD so that the player may thereafter be made to play selections of data components on the CD in the order provided in the CD memory.

SUMMARY OF THE INVENTION

According to this invention, compact disc (CD) or CD-ROM disc having at least one surface region containing a field of digitally encoded, reproducible data, outside of a central region of the disc is provided with a second nonvolatile read/write memory IC chip or memory device, e.g., an E$^2$-PROM, embedded in the central region of the CD or CD-ROM adjacent to the data field. The E$^2$-PROM type memory is preferred because it is small in size and capable of being embedded within the thickness dimension of a CD or CD-ROM and, further, provides a small size memory that may be written into as well as read from. An important aspect of this invention is the employment of the central region of the CD or CD-ROM for embedding a read/write memory device within the physical confines of the CD or CD-ROM near the center thereof where it is not protruding or obstructive relative to the functional rotation and utility of the CD or CD-ROM. In this connection, it is preferred that the embedded memory device be positioned near the center of rotation of the CD or CD-ROM so as to have minimal effect on its uniform rotational velocity when inserted into a CD or CD-ROM player. Further, more than one or a plurality of semiconductor memory devices may be employed uniformly around or on opposite sides of the central aperture of the CD or CD-ROM.

Also, input/output (I/O) terminal means is also embedded in the central region of the CD or CD-ROM and provides for communication with and access to the second nonvolatile memory IC chip device. The terminal means has one surface exposed adjacent to the data field for external access by a CD or CD-ROM access player. The terminal means has a series contact engagement means through which access is made by complementary terminal means provided in the player whereby the movement of the disc is terminated and information may be read into or read out of the second nonvolatile memory IC chip device. The invention has particular application to CD-ROM disc players employed for audio/video games and for dictionary database applications for word processing.

Data may be written into and read out of a memory IC chip device embedded or integral with CD or CD-ROM via an input/output means. In this invention, a memory element, such as, an IC E$^2$-PROM chip, is placed in the center region of the CD or CD-ROM and, further, an I/O terminal for receiving from or transferring to the memory element is exposed on the surface of the CD or CD-ROM in the central region of the disc. By placing a memory chip in a read only type of CD or CD-ROM, it is possible, for example, to store the previous progress of a CD-ROM game or game scores achieved by several participants or to resume the play of the game from the point of previous play which was previously recorded in the IC E$^2$-PROM chip. The E$^2$-ROM chip memory also functions as a smaller memory device for storing frequently used words in the case where a CD-ROM is employed in connection with a word processor program wherein a dictionary word database is provided in the primary memory field of the CD-ROM. Frequently used words are stored in the IC E$^2$-PROM chip and this memory is initially accessed for locating any frequently used words prior to accessing the dictionary word database. Further, in the case of music CDs, if the order of recorded music on the CD is stored randomly, the setting of the order of play of the music for each CD at the time of playback would become unnecessary. Further, if multiple CDs each with an auxiliary embedded IC E$^2$-PROM chip are placed in a multiple CD carriage of a CD player for play, and for read and write operations of data to and from the IC E$^2$-PROM chip, access to and from the IC E$^2$-PROM chip can be performed at high speed.

Other objects and attainments together with a fuller understanding of the invention will become apparent and appreciated by referring to the following descrip-

DESCRIPTION OF THE PREFERRED EMBODIMENTS

Figure 1:
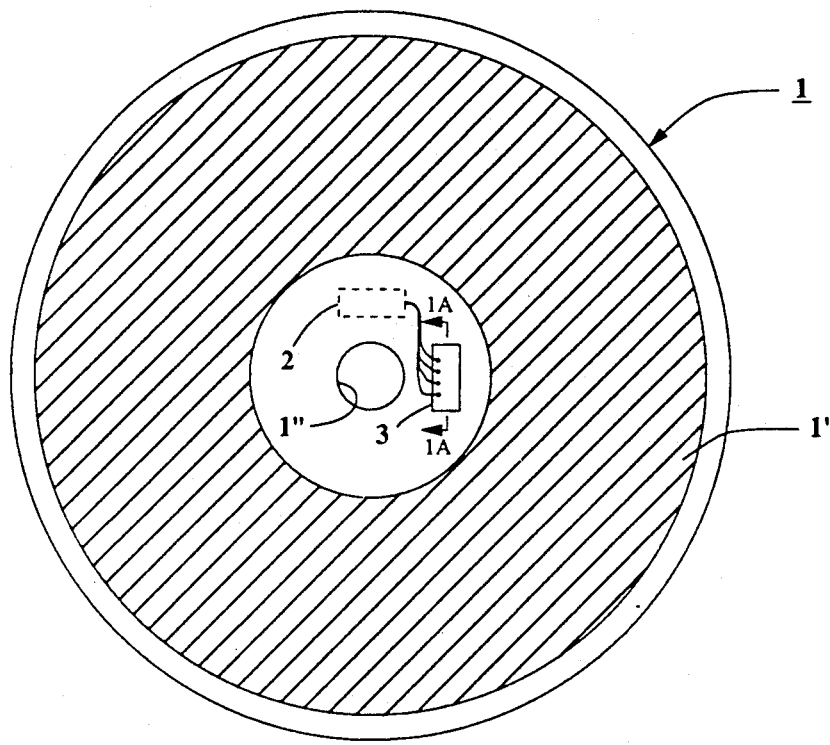
FIG. 1 is a plane view of a CD or CD-ROM incorporating one embodiment of this invention.
Figure 1A:
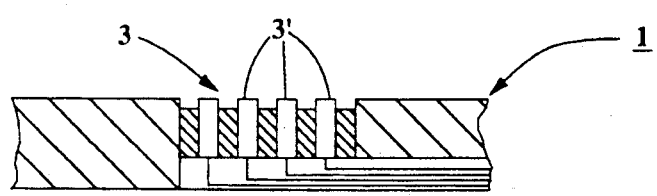
FIG. 1A is a cross sectional view taken along the line 1A—1A of FIG. 1.

Reference is now made to FIG. 1 which discloses a face view of a CD or a CD-ROM 1 (hereinafter collectively referred to as "CD" unless otherwise noted) employed in connection with a first embodiment of this invention. CD 1 comprises an area 1' where, for example, optical recorded information is positioned and is read via a laser. CD contains a contact hole or aperture 1" for receiving a driving mechanism in a CD player. Embedded in the central region of CD 1 outside of the recorded area 1' is a memory device comprising an IC chip, for example, an $E^2$-PROM. In the case where the data, such as music, is stored in area 1' of CD 1, and this data is to be played out in a selected order, then a playback order or sequence is assigned and recorded in IC chip 2. On the other hand, the amount of assigned data that has been played back may be stored in IC chip 2. These are just some examples of the data which may be stored in $E^2$-PROM chip 2. IC chip 2 is electrically connected to input/output (I/O) terminal 3 and, as shown best in FIG. 1A, has surface thereof exposed on the surface of CD 1 to provide for access to the outside world. I/O terminal 3 includes a series of contact elements 3' wherein there is one contact element 3' for each input to $E^2$-PROM chip 2. I/O terminal 3 may be an integral part of the structure of CD 1, as shown in FIG. 1A. I/O terminal 3 may be identical to terminal 23 shown in FIGS. 1 and 3 of U.S. Pat. No. 4,338,644, which reference is incorporated herein by reference thereto.

Memory chip 2 may alternatively be embedded in a position opposite to embedded terminal 3 or, further, one or more additional memory chips 2 may be embedded in opposite relation to chip 2 and terminal 3 across from each other relative to aperture 1". In this manner, a more balanced condition can be obtained relative to the rotational stability of CD 1, although this is not a critical issue.

Figure 1B:
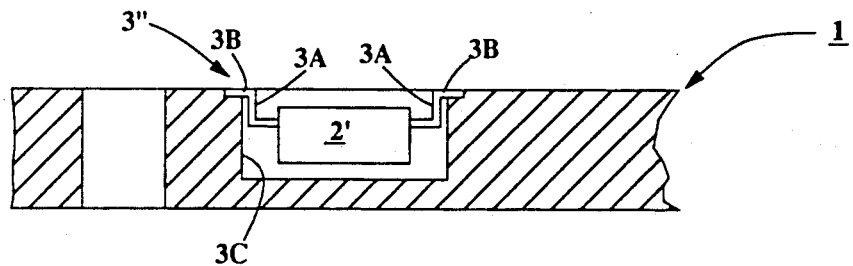
FIG. 1B is a cross sectional view of another embodiment of this invention.

FIG. 1B shows another embodiment of this invention comprising a combination memory and terminal 3" supported in recess 3C in CD 1. Terminal 3" comprises a series of metal leads 3A that have flat pad portions 3B flush with the surface of CD 1. Leads 3A provide for electrical connection to semiconductor memory 2' via pad portions 3B which contact an engagement member associated with a CD or CD-ROM player or playback apparatus. Also, leads 3A function as a physical support for memory 2" within recess 3C of CD 1. Recess 3C may be filled with epoxy or other suitable resin material to embed memory 2' within CD 1.

Figure 2:
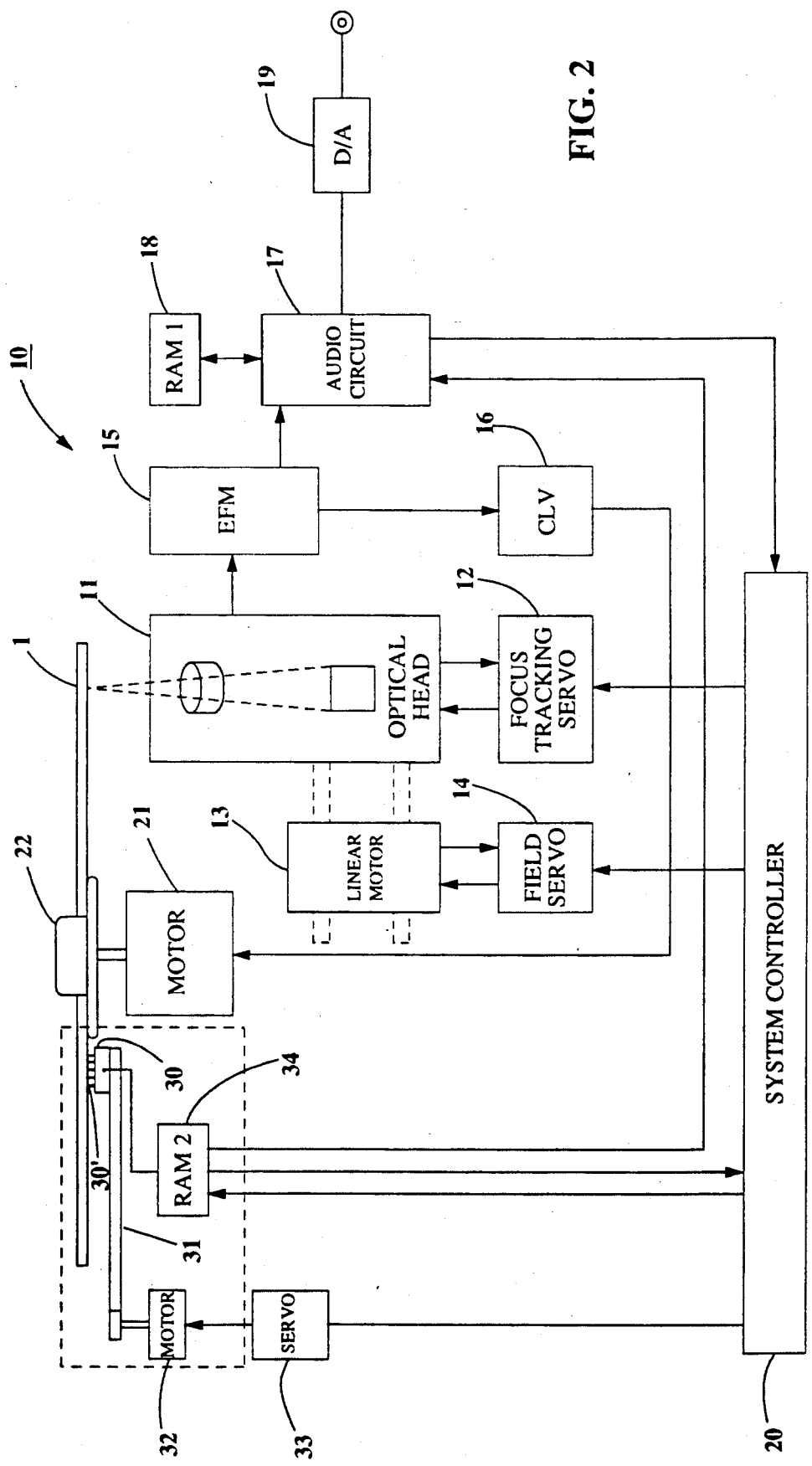
FIG. 2 is a block diagram of a first embodiment of a CD playback apparatus employed in conjunction with the CD of FIG. 1.

FIG. 2 shows a CD playback apparatus 10 with an audio output. The embodiment of FIG. 2 relates to the employment of a CD 1 instead of a CD-ROM 1. Spindle motor 21 rotates CD 1 centered on the hub 22 as shown. Recorded area 1A of CD 1 is face down in this view. Optical head 11 and focus/tracking servo mechanism 12 comprise the signal reproduction portion of apparatus 10. Linear motor 13 moves optical head 11 linearly in the direction of the radius of CD 1. Feed servo mechanism 14 controls the actuation of linear motor 13. EFM (Eight to Fourteen Modulation) reproduction circuit 15 reproduces the signals picked up by optical head 11 to an audio level. CLV (Constant Linear Velocity) servomechanism 16 controls the rotation of spindle motor 21. Audio CIRC (cross interleave reedsolomon code) error detecting circuit 17 provides an audio error correcting function. The remaining components of apparatus that are standard are RAM 1 at 18, D/A converter 19 and system controller 20. All the forgoing components are known in the prior art in CD playback apparatus. However, the following additional special components are employed in connection with this embodiment of the invention.

Arm 31 is rotatable at one end by means of spindle motor 32 and supports pickup terminal 30 at its other end. Terminal 30 engages I/O terminal 3 of CD 1 by means of a series of contact elements 30'. In this connection, terminal 30 may be identical to terminal 24 shown in FIG. 3 of U.S. Pat. No. 4,338,644. Spindle motor 32 rotates pickup terminal 30 to a position for engagement with I/O terminal 3 via contact elements 30' that engage I/O contacts 3' of terminal 3. Servo mechanism 33 controls the functional operation of spindle motor 32 under the control of system controller 20. RAM 2 at 34 temporarily stores the input data into or the output data from $E^2$-PROM 2 of CD 1 via I/O terminals 3 and 30. The operation and timing of motor 32 via servo mechanism 33 and the timing of write/read by RAM 2 at 34 are performed by system controller 20.

In operation of CD playback apparatus 10 described above, servo mechanism 33 is first operated by system controller 20 to operate spindle motor 32 and rotate arm 31 for engagement by pickup terminal 30 with I/O terminal 3 of CD 1 and electrical connection of pickup terminal 30 to I/O terminal 3 of $E^2$-PROM 2 is made for read/write operations to $E^2$-PROM. Then, the stored data in $E^2$-PROM 2 of CD 1, for example, data representing the sequence of data to be reproduced from recorded area 1A of CD 1, is read out of $E^2$-PROM 2 and is accessed from RAM 2 by system controller 20.

Figure 3:
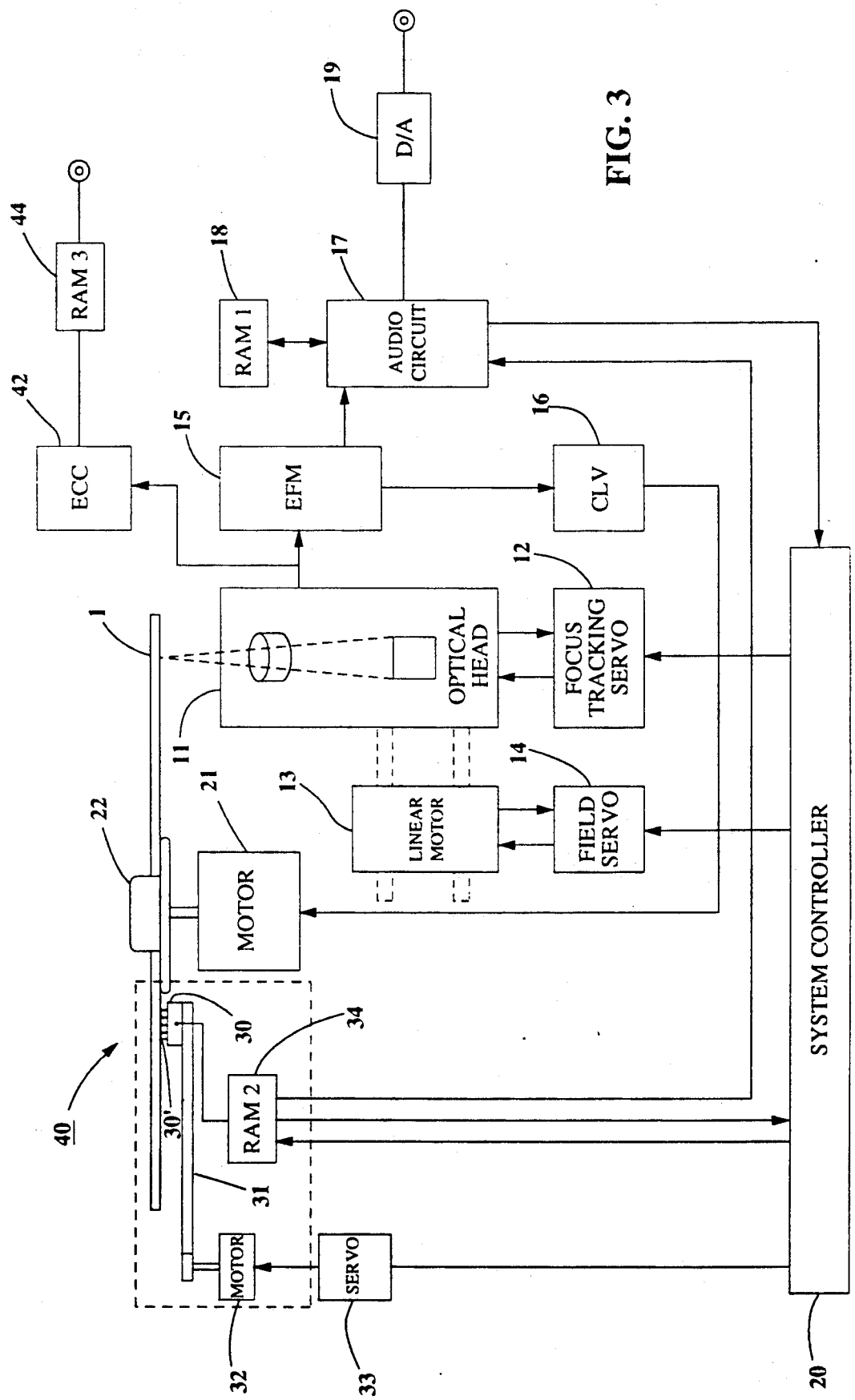
FIG. 3 is a block diagram of a second embodiment of a CD playback apparatus employed in conjunction with the CD of FIG. 1.

The embodiment of FIG. 3 relates to the employment of a CD-ROM 1 instead of a CD 1. CD-ROM 1, for example, may contain data software for employment with video games. Apparatus 40 of FIG. 3 is similar to apparatus 10 of FIG. 2 so that like components carries identical numeral identification and the previous description of such components equally applies to the description of FIG. 3.

Thus, FIG. 3 discloses playback apparatus 40 in which a data reading circuit for CD-ROMs is also included. Playback of voice and music, etc. for video games is performed in the exactly same manner as in the embodiment shown in FIG. 2. However, the video data for display of video game activity is read out of CD-ROM 1 via optical head 11. The video data is than transmitted to error correction circuit (ECC) 42, and error correction is digitally performed. If there is any error, the data is corrected and the corrected data is stored in video RAM 3 at 44. This data is eventually used as the graphic data for games.

Many video games employ software having passwords for access and the use of multiple screens for different segments of the game. For example, if a player has cleared 10 screens of play of a particular game and and must temporally discontinue play, the progress of the game to this point will be also terminated when the gaming system is turn off. The player upon return will have to start the game from the beginning. However, with the embodiment of FIG. 3, the data relating to any pass words and the progression of the game to point of temporary termination are stored in $E^2$-PROM 2 of CD-ROM 1 by engagement of terminal 30 with I/O terminal 3 and pass word and game progression data are stored in $E^2$-PROM 2 via RAM 2 at 34 under the control of system controller 20. At this time, if the power of the gaming system is turned off, the data is stored in $E^2$-PROM 2 will remain intact. Therefore, when the game is resumed, this stored data is selected to be read from $E^2$-PROM 2 and the game may be continued, starting with the progression of the game where the player previous terminated play. Also, $E^2$-PROM 2 may also be employed to store individual game scores for future reference.

The embodiment disclosed in FIG. 3, described for audio/video gaming applications, may also be employed in a word processing system wherein apparatus 40 functions as a CD-ROM dictionary. In this application, $E^2$-ROM chip 2 functions as a smaller memory device for storing frequently used words and system controller 20 provides a searching function via RAM 34 for initial access of such frequently used words prior to access of the main dictionary memory of CD-ROM 41. Controller 20 keeps track of words that are frequently accessed from CD-ROM and when the count thereof reaches a predetermined amount, these words are transferred to $E^2$-PROM 2 for storage. Thus, controller 20 has a capability of maintaining an initially access store of dictionary words frequently employed by a specific user in a word processing system thereby reducing the load on the word processing CPU as well as decrease the required RAM accesses required in conventional dictionary systems.

While the invention has been described in conjuction with several specific embodiments, it is evident to those skilled in the are that many further alternatives, modifications and variations will be apparent in light of the forgoing description. For example, as previously indicated, more than one or a plurality of semiconductor memory devices and associated I/O terminals may be employed uniformly around or on opposite sides of the central aperture of the CD or CD-ROM, such as in a quadrilateral, pentagon, hexagon or octagon formation. Also, more than one memory device may share a single I/O terminal so that only one such terminal need be addressed by the playback apparatus in order to write to or read from addressed locations in several embedded memory devices. Thus, the invention described herein is intended to embrace at such alternatives, modifications, applications and variations as fall within the spirit and scope of the appended claims.

What is claimed is:

1. A compact disc player for receiving a compact disc and reproducing signals recorded in an annular shaped first memory region on at least one surface of said compact disc upon rotation thereof by first drive means and system controller means for controlling the operation of said player and comprising:

a second nonvolatile memory device embedded in said compact disc in a central portion relative to said annular shaped first memory region, I/O terminal means embedded in said compact disc in said central portion and having a first surface engagement means exposed to said one surface, said surface engagement means in electrical communication with said second nonvolatile memory device, transport means in said player having second surface engagement means on one end thereof, second drive means to move said transport means to position said second surface engagement means into and out of physical and electrical engagement with said first surface engagement means when said first drive means is not in operation, intermediate memory means for transfer of data to be written into or read from said second nonvolatile memory device under the control of said system controller means when said first and second engagement means are in electrical communication, said system controller means
prepositioning said compact disc via said first drive means in a predetermined stop position relative to said first surface engagement means and terminating operation of said first drive means, moving said second surface engagement means via said second drive means into contact with said first surface engagement means on said disc where upon data is written into or read from said second nonvolatile memory device under the control of said system controller means while said disc is in said predetermined stop position, removing said second surface engagement means from contact with said first surface engagement means via said second drive means, and resuming rotation of said disc via said first drive means to access data from said first primary memory region.

2. The compact disc player of claim 1 wherein said second non-volatile memory device is an $E^2$-PROM.

3. A method of enhancing data access in a CD or CD-ROM player comprising the steps of:

providing a CD or CD-ROM disc having an annular shaped first primary memory region for store of data relative to operation of an application with a region central of said annular shaped first primary memory region, providing a first drive means in the player for rotational movement of said disc incorporating within said central region a second nonvolatile memory device, providing first access means on the surface of said disc in said central region in electrical communication with said second nonvolatile memory device, providing second access means in the player for electrical communication with the player, providing a second drive means to move said second access means into and out of engagement with said first access means, prepositioning said disc via said first drive means in a predetermined stop position relative to said first access means and terminating rotation of said disc by said first drive means, moving said second access means of the player via said second drive means into engagement with said first access means on said disc where upon data is written into or read from said second non-volatile memory device while said disc is in said predetermined stop position, moving said second access means of the player via said second drive means out of engagement with said first access means on said disc, and resuming rotation of said disc via said first drive means to access data from said first primary memory region.

4. The method of claim 3 wherein the application comprises a audio/video game and said second nonvolatile memory device storing a segment of the play of said game for later retrieval and resumption of play thereof.

5. The method of claim 3 wherein the application comprises a dictionary database for a word processor wherein said first primary memory region is for storing dictionary words, said second non-volatile memory device is for storing frequently accessed dictionary words, and initially accessing said second nonvolatile memory device in said disc for frequently used words prior to accessing said dictionary word store.

* * * * *